Feb. 13, 1923.

G. H. ELWELL.
STUD AND EYELET FASTENING DEVICE.
FILED MAR. 10, 1922.

1,444,867.

WITNESSES
Dorothy G. Elwell
Ruth Elwell

George Henry Elwell
INVENTOR

Patented Feb. 13, 1923.

1,444,867

UNITED STATES PATENT OFFICE.

GEORGE HENRY ELWELL, OF CLEVELAND, OHIO.

STUD AND EYELET FASTENING DEVICE.

Application filed March 10, 1922. Serial No. 542,669.

*To all whom it may concern:*

Be it known that I, GEORGE HENRY ELWELL, a citizen of the United States, residing at Cleveland, in the county of Cuyahoga and State of Ohio, have invented certain new and useful Improvements in Stud and Eyelet Fastening Devices, of which the following is a specification.

My invention relates to improvements in stud and eyelet fastening devices.

The objects of my invention are to provide a stud member adapted to utilize without rattle a grommet as the socket member; to provide a fastening means that is positive against direct withdrawal; and to provide a fastening means the members of which cannot be disengaged except by the tipping in one direction only of one member upon the other.

With this and other objects in view, as will more fully hereinafter appear, the invention consists in certain novel features of construction and arrangement of parts hereinafter described, illustrated in the accompanying drawing and particularly pointed out wherein patentable novelty is claimed for certain features of the device, it being understood that within the scope of what hereinafter thus is claimed various changes in form, proportion, size and minor details of the construction can be made without departing from the spirit or modifying any of the advantages of the invention.

Figure 1:
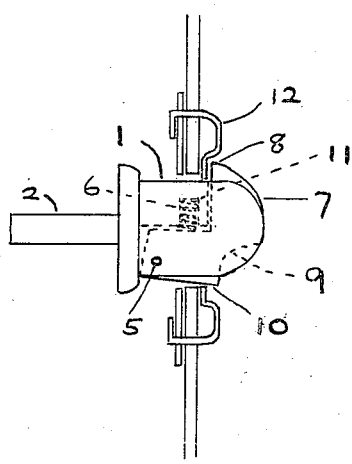
Figure 2:
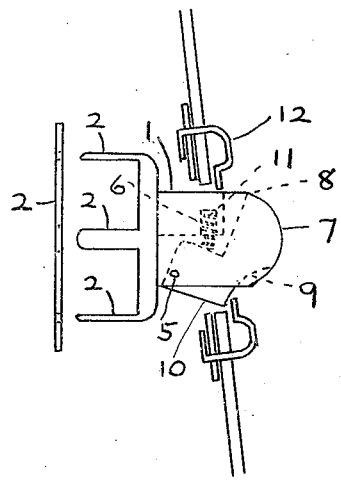
Figure 3:
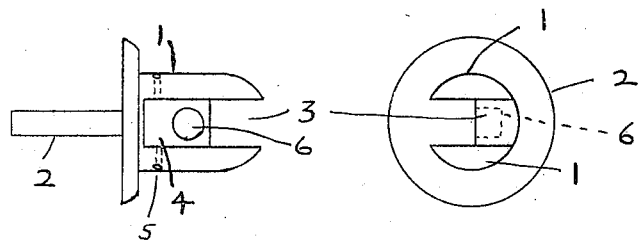

The following is the description of an embodiment of my invention reference being had to the accompanying drawing in which Figure 1 is a side view of the stud member interlocked with a grommet, the latter shown in cross-section; Figure 2 is a side view of the stud member and cross-sectional view of a grommet in disengaged position; and Figure 3 are side and top views of the main portion of the stud member.

Referring more particularly to the drawing in which similar numbers refer to similar parts:—The shank 1 of the stud member may be struck up from sheet metal or made out of the solid cylindrical rod. Attaching means 2 may be adapted, as shown in Figure 1, for attachment to a solid, or, as shown in Figure 2, for attachment to fabric. The free extremity of shank 1 is provided with recess 3 and the longitudinal exterior surface of shank 1 is provided with recess 4 communicating with recess 3, as shown in Figure 3. A seat 6 for coiled spring 11 is provided in the base of recess 4 and bores 5 extending in continuous relation transversely with and across recesses 3 and 4 are provided in shank 1 near the base of the stud member as shown in Figures 1, 2, and 3. The pivotal member 7 is adapted to fit into said recesses 3 and 4. Hook-shaped head 8 with which pivotal member 7 is provided rests within recess 3 but is adapted to extend beyond the cylindrical exterior surface of shank 1 as shown in Figure 2. Pivotal member 7 is provided at the rear portion of head 8 with concave cam surface 9 and said member is pivoted to shank 1 by means of a pin extending through bores 5 and a corresponding bore in pivotal member 7, as shown in Figures 1 and 2. When head 8 is in its extended position laterally beyond the exterior surface of shank 1 the longitudinal edge 10 of pivotal member 7 lying at the opposite exterior surface of shank 1 is substantially flush with that exterior surface. Grommet 12 may be of any construction that provides a reasonably thin circular border surrounding the stud passage, as shown in Figures 1 and 2.

In operation, pivotal member 7 is normally spring-pressed to the position shown in Figure 2. The grommet is placed over the top of the shank and pushed toward the base of the stud member. As the stud passage in the grommet engages concave cam surface 9, it having passed the rearwardly surface of hook-shaped head 8, the pivotal member 7 is forced into alignment with shank 1 with head 8 somewhat extended beyond the exterior surface of shank 1. The grommet is prevented from being directly withdrawn from shank 1 by the rearwardly surface of head 8 serving as a blocking means and the spring-pressed pivotal member 7 bearing against the stud passage in the grommet at a place opposite to that engaged by head 8 holds the grommet rigidly thus preventing rattle, as shown in Figure 1. If a stud member is to be adapted for the accomodation of more than one grommet at one time the shank 1 is lengthened for the purpose and the preceding grommet is pushed closely to the base of the stud member at or beyond the pivot point of pivotal member 7 permitting that member to be freely operated upon the engagement of the next following grommet. Therefore while a grommet is engaged on shank 1 close to the base of the stud member or at the pivot point it matters not that the pivotal member is permitted to assume its normal position; for upon an atempted withdrawal, excepting in the manner hereinafter explained, the rearwardly surface of hook-shaped head 8 will immediately project laterally beyond the exterior surface of shank 1 and block such withdrawal. To disengage the grommet from the stud member it is necessary to pull outwardly that portion of the grommet lying across the stud passage and directly opposite to the laterally projected head 8. This movement tips the grommet upon the stud member until it is free from the longitudinal edge 10 and concave cam surface 9 of the pivotal member 7, as shown in Figure 2. Spring 11 is then permitted to pivotally operate pivotal member 7 to its normal position, as shown in Figure 2, and the rearwardly surface of head 8 being no longer a barrier to the withdrawal of the grommet, the disengagement of the members is easily effected.

What I claim is:—

1. In a stud member the combination of a stud and eyelet fastening device, said stud member having an attaching means and provided with a two piece shank adapted for longitudinal alignment, one of said pieces being integral with said stud member and the other piece being pivotally mounted on said stud member and adapted to be presented at opposite exterior longitudinal surfaces of said shank; blocking means with which said pivotal piece is provided at its free extremity adapted to project laterally beyond the exterior surface of said shank only when said shank pieces are in alignment; and spring means normally adapted to maintain said pieces out of alignment; whereby said shank may be positively interlocked with an eyelet member when the eyelet is pressed onto said shank forcing said pieces into alignment and said blocking means into blocking position, and whereby said eyelet may be removed from said shank only by tipping said eyelet upon said stud member and pulling outwardly that portion of said eyelet located across the stud passage and directly opposite to that portion of said eyelet engaged by said blocking means.

2. In a stud member the combination of a stud and eyelet fastening device, said stud member comprising a two section shank, one of said sections having an attaching base integral therewith and the exterior surface of said section being provided with longitudinal and transverse recesses, said other section pivotally mounted within said longitudinal recess being provided with a hook-shaped head at its free extremity and lying substantially within said transverse recess and thus adapted to extend laterally beyond the exterior surface of said shank, said pivotal section being thereby presented at both opposite exterior lateral surfaces of said stud member at the same time, the exterior of said head being provided with a concave cam surface; and spring means with which said pivotal section is provided and normally adapted to maintain said head within said transverse recess; whereby said stud member is adapted for a positive connecting engagement with an eyelet when said eyelet is passed over the shank operatively engaging said cam surface and forcing said pivotal section into alignment with the main section of said shank and said head to extend laterally beyond the exterior surface of said shank after the eyelet has passed the place of projection, said spring-pressed pivotal section bearing on the eyelet passage thereby holding said eyelet rigidly against rattle.

3. In a stud member the combination of a stud and eyelet fastening device, said stud member comprising a two section shank, one of said sections having an attaching base integral therewith and the other section pivotally mounted on said main section so that both sections are adapted to lie substantially in the same general plane; blocking means integral with said pivotal section and adapted to block the withdrawal of an eyelet engaged upon said shank; spring means with which said pivotal section is provided normally adapted to maintain said pivotal section out of alignment with said main section and said blocking means withdrawn from its blocking position whereby said sections are adapted to be forced into alignment when an eyelet is passed onto both sections, said blocking means assuming its blocking position and both of said sections bearing against opposite portions of the eyelet passage thus holding the eyelet rigidly against rattle.

4. In a stud member the combination of a stud and eyelet fastening device, said stud member having an attaching means and provided with a two piece shank adapted for longitudinal alignment, one of said pieces being integral with said stud member and the other piece being pivotally mounted on said stud member and adapted to be presented simultaneously at diametrically opposite exterior lateral surfaces of said shank; blocking means with which said pivotal piece is provided at its free extremity adapted to project laterally beyond the exterior surface of said shank only when said shank pieces are in substantial alignment; and a concave cam under surface with which said extremity of said pivotal piece is provided; whereby said stud member is adapted for a positive connecting engagement with an eyelet when said eyelet is passed onto said shank member operatively engaging said cam surface and thereby forcing said pivotal shank piece in substantial alignment with the fixed piece of said shank and moving said blocking means to blocking position; and whereby said eyelet may be removed from said shank member only by tipping one member upon the other and pulling said members apart, said tipping movement releasing the under surface of said pivotal shank piece from the shank passage of the eyelet, and said pulling movement, being exerted against the rearwardly facing surface of said blocking means, operates forwardly said pivotal shank piece until said blocking means remains no longer a barrier to the release of said members.

5. In a stud member the combination of a stud and eyelet fastening device, said stud member having an attaching means and provided with a two piece shank adapted for longitudinal alignment, one of said pieces being integral with said stud member and the other piece being movably mounted on said stud member and adapted to be rigidly and simultaneously presented at diametrically opposite exterior lateral surfaces of said shank; blocking means integral with said movable piece and adapted to project laterally beyond the exterior surface of said shank; spring means with which said movable piece is provided and adapted to maintain said blocking means in a retracted position; and a concave cam surface with which the under-surface of said movable member is provided; whereby said stud member is adapted for a positive connecting engagement with an eyelet when said eyelet is passed onto said shank member operatively engaging said cam surface and thereby forcing said movable member against the tension of said spring means to its blocking position as a barrier to the withdrawal of the eyelet and whereby said eyelet may be removed from said shank member only by a tipping movement of one fastener member upon the other and pulling said members apart, said tipping movement releasing the under-surface of said movable member from within the eyelet passage and permitting said spring means to return said movable member to normal position with said blocking means no longer a barrier to the withdrawal of said eyelet.

GEORGE HENRY ELWELL.